UNITED STATES PATENT OFFICE.

ERNST BRÜHL, OF BERLIN, GERMANY.

POWDER FOR DUSTING PATTERNS IN FOUNDRIES.

No. 811,477. Specification of Letters Patent. Patented Jan. 30, 1906.

Application filed September 29, 1904. Serial No. 226,592.

*To all whom it may concern:*

Be it known that I, ERNST BRÜHL, chemist, a citizen of Germany, residing at No. 61 Sebastianstrasse, Berlin, in the Kingdom of Prussia and Empire of Germany, have invented a new and Improved Powder for Dusting the Patterns in Foundries, of which the following is a specification.

My invention relates to an improved powder for dusting the patterns used in making sand molds in foundries.

The improved powder is a perfect substitute for the lycopodium powder, combining the same good qualities of the latter while being much cheaper.

Lycopodium powder is at present used for dusting the patterns because it will not absorb water or any other liquid, because it will not melt even at high temperatures, and, lastly, because it will burn away completely without leaving a residue when the molten metal is poured into the mold. The powder which is the subject of the present invention has the same good qualities as lycopodium powder, while being cheaper.

My improved powder is obtained by filling the pores of a very porous material, such as charcoal or silicious marl, with a resin, such as sandarac, copal, shellac, acaroid resin, or oil. This may be done by first dissolving the resin in some solvent, then saturating the porous material with the solution, and thereafter evaporating the solvent, or the resin may be melted and mixed with the porous material and the whole ground to powder after it has become cold and hard. I have found the following process very advantageous in the manufacture of my improved powder: The porous material, such as silicious marl, and the hard resin, such as sandarac, are mixed dry and then gradually heated to a temperature of from 300° to 570° Fahrenheit. The resin will first become soft and will finally melt. As it is gradually absorbed by the porous material the whole mixture acquires a doughy cheesy consistency and will remain so and will not become liquefied even if the temperature be raised. When the mixture has reached this stage, the resin is almost entirely absorbed in the pores of the porous material. While the resin is being thus heated, together with the porous material, the resin undergoes a change which becomes apparent by its being harder and more brittle after getting cold. Moreover, the resin loses its adhesiveness, which is a very disagreeable property, especially for pattern-powders. By this change the resin loses from ten to twenty per centum of its weight, partly owing to the evaporation of its water content and partly owing to the gases developed and driven off by chemical changes which it undergoes. The proportions of the porous material and the resin used will vary according to the capacity of the porous material to absorb the resinous substance. It is very important that resin should not remain free in the mixture in any considerable quantity, as it would melt when heated and stop up the pores of the mold. On the other hand, the amount of porous material used should not be too great, as otherwise the powder finally obtained would be too porous. As a rule, up to twenty per centum of the resin may be taken for silicious marl and up to fifty per centum of the resin may be taken for charcoal. The caked substance obtained by the above process has a homogeneous fracture after it has become cool and has entirely lost the properties of a mixture, such as would be obtained by melting resin with a non-porous material. The caked substance may be reduced to powder by any suitable means or method. It will be found that the powder may be ground as finely as may be required and will not clog or stick to the pestle or mortar, as would be the case with resin or resin mixtures.

A little sulfur may be added to the resin, which will increase the hardening thereof when heated. Dinitronaphthalene in larger or smaller quantities or as a solvent may be used. When charcoal is used as the porous material in mixing my improved powder, the dinitronaphthalene will also serve as coloring material.

When charcoal is used in making my improved powder, as hereinbefore described, the resulting powder is dark in color and will burn away completely. Silicious marl will make a powder which is lighter in color, but will leave a residue when burned, but as this residue consists of silicic anhydrid, which is the same substance as that of which the mold is made, the latter is not thereby soiled.

My improved product is infusible, non-hygroscopic, non-adhesive, and of lower specific gravity than water.

Having thus described my invention, I claim—

The herein-described product consisting of a resinous substance incorporated with silicious marl.

In witness whereof I have hereunto set my hand in the presence of two witnesses.

ERNST BRÜHL.

Witnesses:
 WOLDEMAR HAUPT,
 HENRY HASPER.